United States Patent [19]

Shimizu et al.

[11] 4,317,183
[45] Feb. 23, 1982

[54] UNUSED PROGRAM NUMBER INDICATING SYSTEM FOR A SMALL PROGRAM TYPE ELECTRONIC CALCULATOR

[75] Inventors: Tomohiro Shimizu, Fussa; Yoshinobu Muranaga, Higashikurume, both of Japan

[73] Assignee: Casio Computer Co., Ltd., Tokyo, Japan

[21] Appl. No.: 102,387

[22] Filed: Dec. 11, 1979

[51] Int. Cl.³ .............................................. G06F 13/00
[52] U.S. Cl. .................................................... 364/900
[58] Field of Search ............... 364/200, 900 MS File, 364/705, 709

[56] References Cited

U.S. PATENT DOCUMENTS 3,576,543  4/1971  Smith ................................ 364/200
4,117,542  9/1978  Klausner et al. .................. 364/900

*Primary Examiner*—Gareth D. Shaw
*Assistant Examiner*—David Y. Eng
*Attorney, Agent, or Firm*—Frishauf, Holtz, Goodman & Woodward

[57] ABSTRACT

An unused program number-indicating system for a small program type electronic calculator, wherein input program data are all stored in a program data memory. A detection circuit detects a program number corresponding to the program data read out of the program data memory, and used and/or unused program numbers are displayed in the prescribed form by control circuits.

4 Claims, 5 Drawing Figures

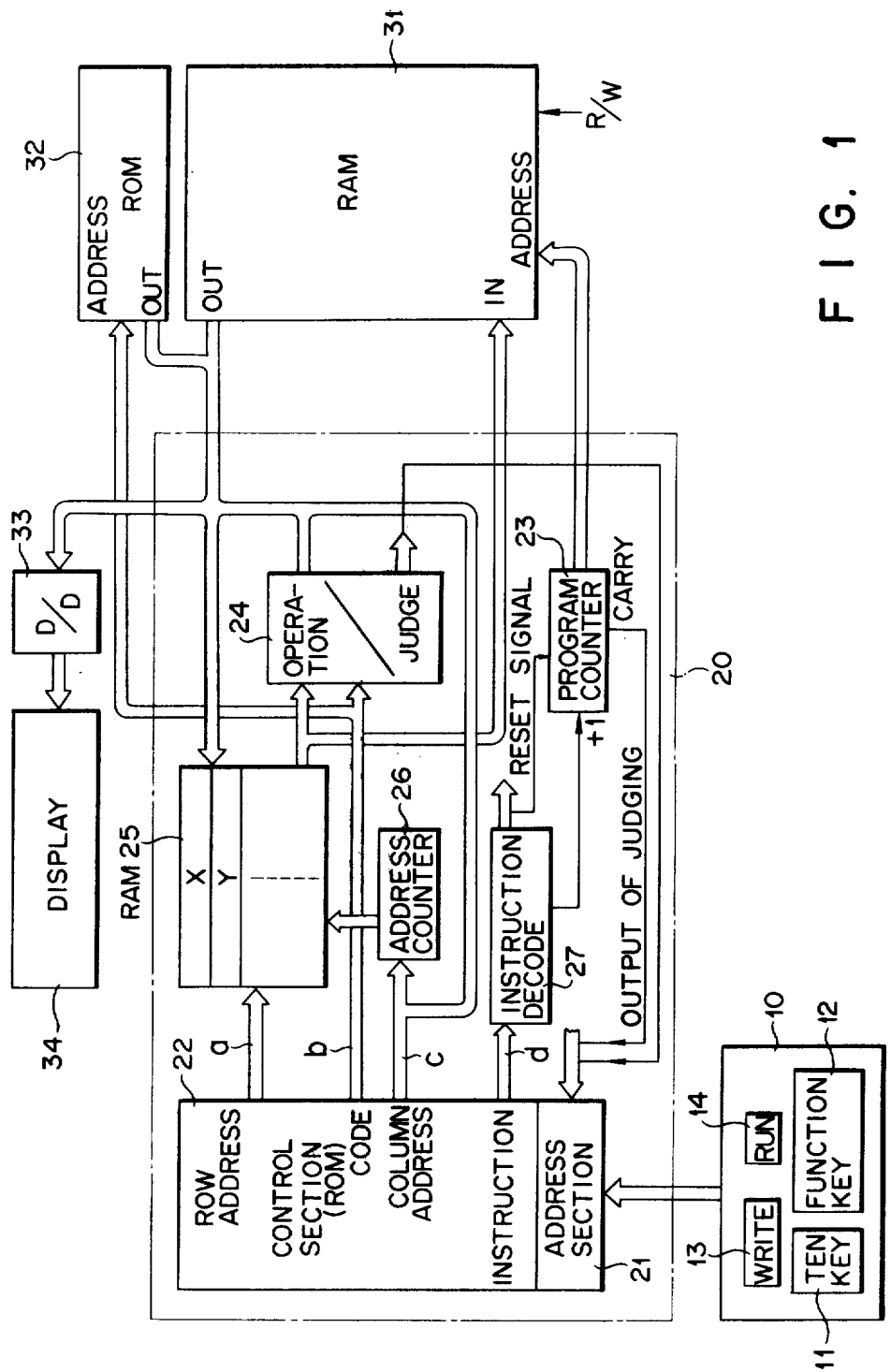
F I G. 1

UNUSED PROGRAM NUMBER INDICATING SYSTEM FOR A SMALL PROGRAM TYPE ELECTRONIC CALCULATOR

This invention relates to an unused program number-indicating system for a small program-type electronic calculator.

BACKGROUND OF THE INVENTION

A small program-type electronic calculator is arranged for a plurality of programs to be stored in a memory. A program number or program bell is attached to the starting section of the respective programs to distinguish the memory regions in which they are stored. When data is going to be written in a memory, the selection of a program number is generally left to the operator's discretion or judgement. Where, therefore, the operator does not remember a program number which is to be specified for the writing of data, it is necessary for him to recognize the used program numbers by checking previously stored data. This operation consumes a great deal of time and work. Further difficulties are that if new data should happen to be stored in a memory region bearing a used program number without carrying out the above-mentioned previous check, then the preceding data stored in a memory region corresponding to a wrongly selected program number would be cleared, leading to the erroneous behavior of the calculator as a whole.

This invention has been accomplished in view of the above-mentioned circumstances, and is intended to provide an unused program number indicating system, which, where a small electronic calculator is set for the write mode, indicates unused program numbers, thereby enabling the operator to be easily informed of the used program numbers.

SUMMARY OF THE INVENTION

To this end, the present invention provides an unused program number-indicating system for a small program-type electronic calculator which comprises: a keyboard including a plural number of specific keys other than numeral keys or functional keys; display means for displaying information which in inputted by key operation of said keyboard and results thereby; a program storing means for storing a prescribed plural pair of program information including program numbers, as program labels, of said inputted information; a non-variable data storing means for storing all program numbers which correspond to the number of a plural pair of program information; a detection means coupled to said program storing means for detecting program numbers of program information which is stored in said program storing means by keyboard operation; a used program comparing means coupled to said detection means for comparing program numbers which are detected by said detection means with all program numbers which correspond to the number of a plural pair of program information stored in said non-variable data storing means; and a display control means coupled to said display means for displaying, in prescribed form, all used or unused program numbers on said displaying means according to results of said comparing means and for indicating program numbers which an operator can use.

The above-mentioned arrangement offers the advantages that where fresh data is going to be written, a clear distinction can be made between used and unused program numbers, making it unnecessary for the operator to remember used program numbers or check the used program numbers by being informed of previously stored data, and consequently simplifying the writing operation. It is also possible to eliminate the drawback of erasing data corresponding to the used program numbers, which might otherwise occur by the operator's mishandling of the calculator.

BRIEF DESCRIPTION OF THE DRAWINGS

FIG. 1 is a block circuit diagram of an unused program number-indicating system embodying this invention;

DETAILED DESCRIPTION

Figure 2:
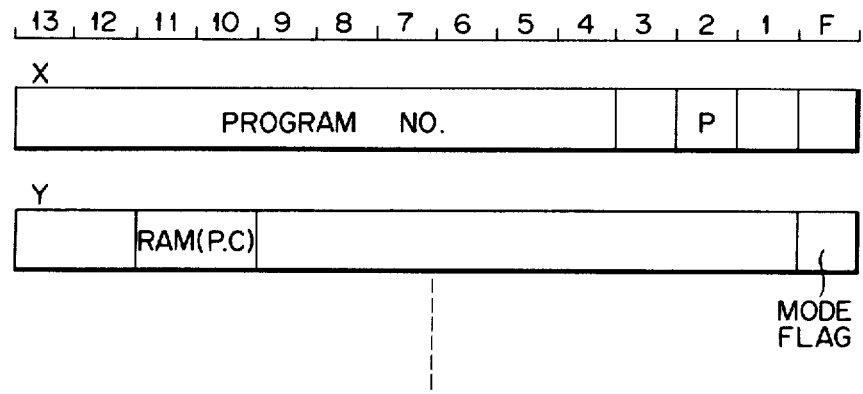
FIG. 2 illustrates the contents of a randam access memory (RAM) included in the central processing unit (CPU) of FIG. 1.

Referring to FIG. 1, reference numeral 10 denotes a key input section which comprises a ten-key subsection 11, function key subsection 12, write mode-specifying WRITE key subsection 13 and program start-instructing RUN key subsection 14. Key input data delivered from the key input section 11 is supplied to an address section 21 included in the CPU 20. The address section 21 specifies the selected one of the addresses of a control section 22. The address section 21 is supplied with address-specifying data which is constituted by an input signal sent forth from the key input section 10, a carry signal issued from the latter described program counter 23 and an output judgement signal from an arithmetic operation-judgement section 24. The control section 22 is formed of, for example, a read only memory (ROM), in which various microprograms are stored. The ROM is provided with an output line a for selecting a desired one from among the row addresses of a random access memory (RAM) 25, code signal output line b, an output line c for selecting a desired one from among the column addresses of the RAM 25, and instruction output line d, and carries out various forms of control. A row address signal issued from the output line a of the control section 22 is conducted directly to the RAM 25. A column address signal delivered from the output line c is stored in an address counter 26, whose contents are conducted to the RAM 25. After supplied with data on the first column address, the address counter 26 continues up-counting upon arrival of successive timing signals and can advance said upcounting, if necessary, to that of the column addresses of the RAM 25 which has the specified order. The RAM 25 is formed of various arithmetic operation registers such as X registers and Y registers. The row address specifies the registers of the RAM 25. The column address defines the sequential order of the digits of the above-selected register. The data read out from the RAM 25 is sent forth to the arithmetic operation-judgement section 24, which receives an output code signal from the output line b of the control section 22. This arithmetic operation-judgement section 24 arithmetically processes an input data and judges whether or not the result of said arithmetic operation contains a numeral or carry signal. The result of said arithmetic operation is supplied to the RAM 25, and the result of the judgement is conducted to the address section 21 of the CPU 20. An instruction sent forth from the output line d of the control section 22 is decoded by an instruction decoder 27. As a result, the control section 22 supplies a control instruction to the various sections of the captioned unused program number-indicating system, for example, an arithmetic operation instruction to the arithmetic operation-judgement section 24 and a read-write instruction to the RAM 25. The instruction decoder 27 supplies a +1 signal and also a reset signal to the program counter 23, which specifies the address of an external RAM 31 disposed outside of the CPU 20 to store program data. The external RAM 31 is supplied with a data read out of the RAM 25 of the CPU 20. The external RAM 31 is set for the read or write mode upon receipt of a read-write instruction R/W sent forth from the instruction decoder 27. An output signal from the external RAM 31 is conducted to the RAM 25 of the CPU 20. Provided outside of the CPU 20 is an external ROM 32 for storing a constant. This external ROM 32 stores not only a constant data, for example, $\pi$, but also the prescribed data, for example, program numbers such as 9, 8, 7, 6, 5, 4, 3, 2, 1, O, P. The address of the external ROM 32 is specified by an output code signal issued from the output line b of the control section 22. A constant read out of the external ROM 32 is carried to the RAM 25 of the CPU 20. An X register included in the RAM 25 is used concurrently as a register for arithmetic operation and also for display. The contents of the X register are conducted to an external display drive circuit 33 through the arithmetic operation-judgement section 24 of the CPU 20. As a result, a display section 34 is put into operation by the display drive circuit 33.

FIG. 2 shows the contents of the X and Y registers of the RAM 25. The X and Y registers are each formed of fourteen digits. A zero digit stores a flag. The 1st to the 13th digits are used to store data. Where an unused program number is to be displayed, a program number read out of the external ROM 32 is written in any of the 1st to the 13th digits. A character "P" denoting a program is written in the 2nd digit of the X register. Program numbers of 0 to 9 are respectively stored in the 4th to the 13th digits. In the Y register, a mode flag denoting a write mode is written in the zero digit. The contents of the external RAM 31 whose address is specified by an output signal from the program counter 23 are stored in the 10th and 11th digits.

Figure 3:
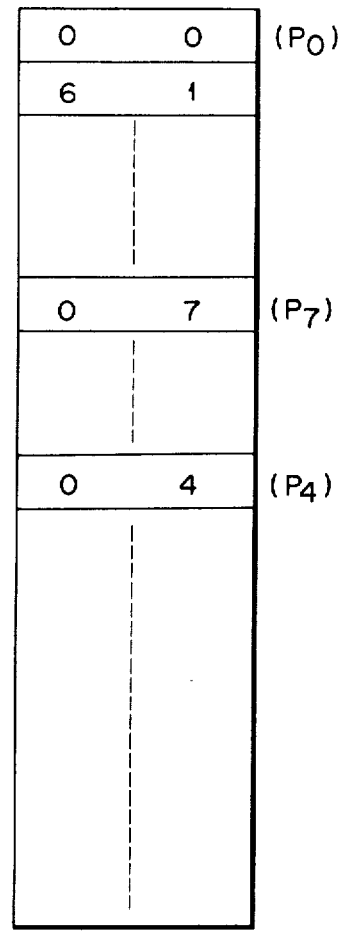
FIG. 3 indicates program data stored in an external RAM.

FIG. 3 shows the manner in which programs are stored in the external RAM 31. The foremost position of each program bears its number. The external RAM 31 is formed of, for example, two digits and contains addresses of [000] to [127], and can store ten programs of $P_0$ to $P_9$. In this case, program numbers are indicated by the numeral "0" to "9". The higher digit of the external RAM 31 indicates a numeral of "0", and a lower digit actually shows a program number. Where the higher digit of the external RAM 31 stores data represented by the numeral of "0" or any other numeral, then data other than that denoted by any of the numerals of "0" to "9" which is stored in the lower digit of the external RAM 31 denotes the contents of a program.

Figure 4:
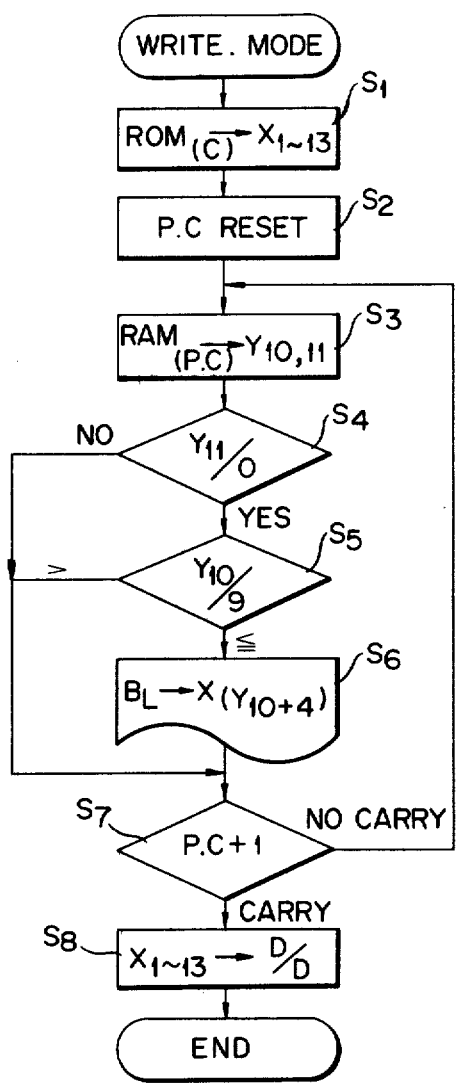
FIG. 4 is a flow chart showing the successive processing steps taken by the unused program number-indicating system of the invention.
Figure 5:
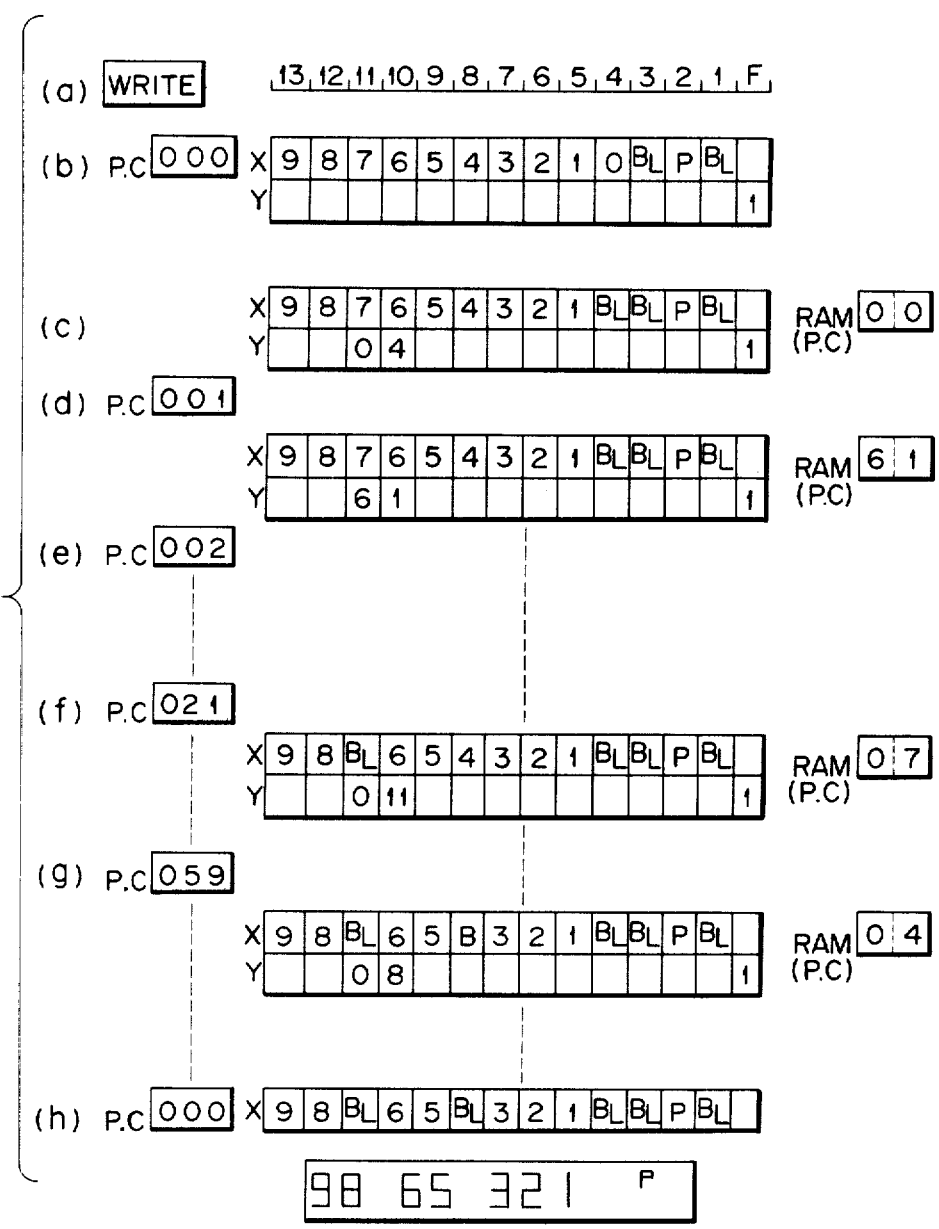
FIGS. 5(a) to 5(h) indicate the contents of the registers, program counters and external RAMS for the respective processing steps and the form in which said contents are displayed.

There will now be described by reference to the appended drawing the operation of an unused program number-indicating system embodying this invention which is arranged as described above. Where a program is written, then the WRITE key 13 of the key input section 10 is operated to get ready for the write mode (FIG. 5a). A signal denoting the operation of the WRITE key 13 is supplied to the address section 21 of the CPU 20. This address section 21 specifies the address of the control section 22 to display an unused program number (FIG. 4). A code signal specifying the address of the external ROM 32 is issued from the output line b of the control section 22. As a result, all the program numerals of "9, 8, 7, 6, 5, 4, 3, 2, 1, 0, $B_L$, P, $B_L$" are read out of the external ROM 32, and written in the 1st to the 13th memory sections of the X register as shown in the step S1 of FIG. 4 and FIG. 5(b). The character BL given in the above-mentioned program numerals represents a blanking code. At the write mode, a digit "1" denoting the write mode is stored in the flag memory section of the Y register (FIG. 5b). Then the write mode operation goes to the succeeding step S2 of FIG. 4, in which a reset signal is supplied from the control section 22 to the program counter 23 through the instruction decoder 27. In the following step S3, the address of the external RAM 31 is specified in accordance with the contents of the program counter 23. Data is read out of the specified address to the 10th and 11th digits of the Y register. Now let it be assumed that the programs of FIG. 3 were stored in the external RAM 31. Then the program counter 23 specifies the address of "000". As a result, data denoted by "00" ($P_0$) is read out of the specified address of the external RAM 31 to the 10th and 11th digits of the Y register. In the succeeding steps S4, S5, judgement is made as to whether the data thus read out denotes a program number. Namely, in the step S4, judgement is made as to whether the contents of the 11th digit of the Y register denote "0" or not. If said contents indicate "0", then the write operation further goes on to the step S5 in which determination is made as to whether the contents of the 10th digit of the Y register represent a numeral larger than "9". If the contents of said 10th digit indicate a numeral smaller than "9", then the succeeding step S6 is taken. A number of "4" is added to the contents Y10 of the 10th digit of the Y register. The result of said addition is transmitted from the arithmetic operation-judgement section 24 to the address counter 26. A blanking (BL) code is stored in the corresponding digit of the X register. Since the program numbers are stored, as previously described, in the digits of the X register having the 4th and higher orders, the aforesaid added number of "4" is used to correct the sequential orders of said digits. Since, in the above-mentioned case, the contents of the 10th digit Y10 of the Y register denote "0", the result of addition, that is +4, indicates a number of "4". Therefore, the address counter 26 is set at "4". As a result, a BL code is written in the 4th digit of the X register as shown in FIG. 5(c). If the step S6 is brought to an end, or the step S4 makes a judgement of "NO", or the contents of the digit Y10 of the Y register are determined to be larger than "9", in the step S5, then the step S7 is taken, in which the instruction decoder 27 supplies a signal of +1 to the program counter to increase its contents by 1. At this time, judgement is made as to whether a carry signal has been issued as the result of the addition of said +1 signal. Namely, determination is made as to whether all data have been fully read out of the external RAM 31. Where, in the step S7, no carry signal is issued, and the reading of all data out of the external RAM 31 is not brought to an end, the operation of the captioned unused program number-indicating system is brought back to the step S3. At this time, the contents of the succeeding address of the external RAM 31 specified by an output signal from the program counter 23 are read out, as shown in FIG. 5(d) to the 10th and 11th digits of the Y register. The contents of the external RAM 31 read out to the Y register at this time denote "61", that is the contents of the program $P_0$. Accordingly, the operation of the captioned unused program number-indicating system is jumped from the step S4 to the step S7 to increase the contents of the program counter 23 by one. Thereafter the step S3 is taken again. Thereafter, the above-mentioned cycle of operation is repeated. Where, as shown in FIG. 5(f), a program number "07" (P7) is next read out of the external RAM 31 to the Y register, then the steps S4, S5, S6 are taken in succession. A number of "4" is added to a number of "7" stored in the 10th digit Y10 of the Y register to provide a number of "11". The result of this addition is supplied to the address counter 26. A blanking (BL) code is written in the 11th digit of the X register to blank a program number of "7". Similarly a program number of "0" (P4) stored in the external RAM 31 is blanked as shown in FIG. 5(g).

When the contents of the external RAM 31 are checked up to the last address of "127", then a "carry" signal is issued in the step S7 and the following step S8 is taken. At the step S8, the contents of the X register are sent to the display drive circuit 33 through the arithmetic operation-judgement section 24 to be displayed in the display section 34 as shown in FIG. 5(h). Among all the program numbers initially stored in the X register, the program numbers already written in the external RAM 31, for example, "7", "4" and "0" (in the case of the above-mentioned embodiment) are blanked. Therefore, the unused program numbers of "9", "8", "6", "5", "3", "2", and "1" are displayed in the display section 34.

With the above-mentioned embodiment, the used program numbers were blanked. Conversely, it is possible to blank unused program numbers said display used program numbers. Further, it is possible to display all the program numbers, and distinguish between the used and unused program numbers by a decimal point.

What we claim is:

1. An unused program number-indicating system for a small program-type electric calculator comprising:
    a keyboard including a plural number of specific keys other than numeral keys or functional keys;
    display means for displaying information which is inputted by key operation of said keyboard and results thereby;
    a program storing means for storing a prescribed plural pair of program information including program numbers, as program labels, of said inputted information;
    a non-variable data storing means for storing all program numbers which correspond to the program number of a plural pair of program information;
    a detection means coupled to said program storing means for detecting program numbers of program information which is stored in said program storing means by keyboard operation;
    a used program comparing means coupled to said detection means for comparing program numbers which are detected by said detection means with all program numbers which correspond to the number of a plural pair of program information stored in said non-variable data storing means; and
    a display control means coupled to said display means for displaying, in prescribed form, all used or unused program numbers on said displaying means according to results of said comparing means and for indicating program numbers which an operator can use.

2. The unused program number-indicating system according to claim 1, wherein the display control means includes means for causing said display means to display, on a prescribed program number display position of said display means, all the program numbers detected by said detection means and to blank-display all the unused program numbers undetected by said detection means.

3. The unused program number-indicating system according to claim 1, wherein the display control means includes means for causing said display means to blank-display, on a prescribed program number display position of said display means, all the program numbers detected by said detection means and to display all the unused program numbers undetected by said detection means.

4. The unused program number-indicating system according to claim 1, wherein the display control means includes means for causing said display means to display all the program numbers and further give specific symbols to the used program numbers or the unused program numbers indicated by reference to the used program numbers detected by said detection means.

* * * * *